United States Patent
Lee et al.

(10) Patent No.: US 12,372,744 B2
(45) Date of Patent: Jul. 29, 2025

(54) LENS ASSEMBLY AND ELECTRONIC DEVICE INCLUDING THE SAME

(71) Applicant: SAMSUNG ELECTRONICS CO., LTD., Suwon-si (KR)

(72) Inventors: Kiwoo Lee, Suwon-si (KR); Dong Kyung Nam, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 886 days.

(21) Appl. No.: 17/483,062

(22) Filed: Sep. 23, 2021

(65) Prior Publication Data

US 2022/0236521 A1    Jul. 28, 2022

(30) Foreign Application Priority Data

Jan. 27, 2021 (KR) .................. 10-2021-0011820
Apr. 16, 2021 (KR) .................. 10-2021-0050056
Jun. 29, 2021 (KR) .................. 10-2021-0084453

(51) Int. Cl.
*G02B 9/60* (2006.01)
*G02B 13/06* (2006.01)
*G02B 27/64* (2006.01)
*H04N 23/55* (2023.01)

(52) U.S. Cl.
CPC .............. *G02B 9/60* (2013.01); *G02B 13/06* (2013.01); *G02B 27/646* (2013.01); *H04N 23/55* (2023.01)

(58) Field of Classification Search
CPC ........ G02B 9/60; G02B 13/06; G02B 27/646; G02B 13/0045; G02B 13/0065; G02B 26/0816; H04N 23/55; H04N 23/58; H04N 5/265; H04N 23/54; H04N 23/951; H04N 23/957; G03B 2205/0023; G03B 5/00; G03B 30/00
See application file for complete search history.

(56) References Cited

U.S. PATENT DOCUMENTS

| | | | |
|---|---|---|---|
| 9,955,082 B2 | 4/2018 | Laroia | |
| 10,412,298 B2 | 9/2019 | Li | |
| 10,578,948 B2 | 3/2020 | Shabtay et al. | |
| 10,645,286 B2 | 5/2020 | Fridman et al. | |
| 11,796,764 B2* | 10/2023 | Huh | G02B 9/60 |
| 2011/0063446 A1 | 3/2011 | McMordie et al. | |
| 2018/0081149 A1* | 3/2018 | Bae | G02B 7/021 |
| 2018/0152623 A1 | 5/2018 | Li | |
| 2020/0128161 A1 | 4/2020 | Kroekel et al. | |
| 2020/0409037 A1* | 12/2020 | Kuo | G02B 5/005 |

(Continued)

FOREIGN PATENT DOCUMENTS

JP     2020-43475 A     3/2020

*Primary Examiner* — Ricky L Mack
*Assistant Examiner* — K Muhammad
(74) *Attorney, Agent, or Firm* — Sughrue Mion, PLLC

(57) ABSTRACT

Provided are a lens assembly and an electronic device including the lens assembly, the lens assembly including a first reflector configured to rotate around a first rotation axis, a second reflector configured to rotate around a second rotation axis, a plurality of lenses, and an image sensor configured to generate a plurality of captured images having different capturing views based on a rotation of at least one of the first reflector or the second reflector, in which the first reflector, the second reflector, the plurality of lenses, and the image sensor are provided in sequential order from an object's side.

18 Claims, 10 Drawing Sheets

(56) References Cited

U.S. PATENT DOCUMENTS

| | | | |
|---|---|---|---|
| 2021/0096322 A1* | 4/2021 | Kang | H04N 23/55 |
| 2021/0278636 A1* | 9/2021 | Lin | G02B 13/04 |
| 2022/0026682 A1* | 1/2022 | Wu | G02B 13/0045 |
| 2022/0311917 A1* | 9/2022 | Yang | G02B 13/0065 |

* cited by examiner

LENS ASSEMBLY AND ELECTRONIC DEVICE INCLUDING THE SAME

CROSS-REFERENCE TO RELATED APPLICATION

This application claims priority to Korean Patent Application No. 10-2021-0011820 filed on Jan. 27, 2021, Korean Patent Application No. 10-2021-0050056 filed on Apr. 16, 2021, and Korean Patent Application No. 10-2021-0084453 filed on Jun. 29, 2021, in the Korean Intellectual Property Office, the disclosures of which are incorporated by reference herein in their entireties.

BACKGROUND

1. Field

Example embodiments of the present disclosure relate to a lens assembly and an electronic device including the lens assembly.

2. Description of Related Art

The development of an optical technology and an image processing technology has brought the widespread use of capturing devices in various fields such as multimedia contents, security, recognition, and the like. A capturing device may be provided in, for example, a mobile device, a camera, a vehicle, and a computer, to capture an image or obtain data for recognizing an object or controlling such a device. The volume of the capturing device may be determined based on the size of a lens, a focal length of the lens, and the size of a sensor. In a limited space where the volume of the capturing device is limited, the focal length increased by a change in a lens structure may be provided.

SUMMARY

Example embodiments provide a lens assembly and an electronic device including the lens assembly.

Example embodiments may address at least the above problems and/or disadvantages and other disadvantages not described above. Also, the example embodiments are not required to overcome the disadvantages described above, and an example embodiment may not overcome any of the problems described above.

According to an aspect of an example embodiment, there is provided a lens assembly including a first reflector configured to rotate around a first rotation axis, a second reflector configured to rotate around a second rotation axis, a plurality of lenses, and an image sensor configured to generate a plurality of captured images having different capturing angles based on a rotation of at least one of the first reflector and the second reflector, wherein the first reflector, the second reflector, the plurality of lenses, and the image sensor are provided in sequential order, wherein the plurality of lenses includes a first lens, a second lens, a third lens, a fourth lens, and a fifth lens, which are provided in sequential order, and wherein a distance from the first lens to an upper surface is TTL, a synthetic focal length of the lens assembly is f', a focal length of the first lens is f1, a focal length of the second lens is f2, and the lens assembly satisfy $TTL/f'<1.0$, and $0<(f1+f2)/f'<0.03$.

A focal length of the third lens may be f3 and a focal length of the fourth lens may be f4, and the lens assembly may satisfy $0.04<(f3+f4)/f'<0.06$.

An Abbe number of the third lens may be L3Ab and an Abbe number of the fourth lens may be L4Ab, the lens assembly may satisfy $19<L3Ab<25$, and $19<L4Ab<25$.

The first lens may have positive refractive power with a convex form, wherein the second lens may have negative refractive power, wherein the third lens may have positive refractive power with a biconvex form, wherein the fourth lens may have negative refractive power, and wherein the fifth lens may have positive refractive power.

Each of the plurality of captured images may correspond to a high-resolution telephoto image.

The plurality of captured images may be synthesized into a single high-resolution wide-angle image, and the plurality of captured images may form different regions corresponding to the different capturing angles in the high-resolution wide-angle image.

The lens assembly may further include an aperture stop provided between the second reflector and the plurality of lenses, the aperture stop being configured to adjust an amount of light.

An aperture circle of each of the lenses included in the plurality of lenses may be smaller than an image circle of the image sensor.

An aperture height of each of the lenses included in the plurality of lenses corresponding to positions through which rays provided in an image formation range corresponding to a short side of the image sensor pass the lenses respectively may be less than or equal to the short side of the image sensor.

A short side of the image sensor may be less than or equal to 7 millimeters (mm).

According to another aspect of an example embodiment, there is provided an electronic device including an imaging assembly configured to sense visual information of an object by a lens assembly, the image assembly being configured to generate a captured image based on the visual information, and a display configured to display the captured image, wherein the lens assembly includes a first reflector configured to rotate around a first rotation axis, a second reflector configured to rotate around a second rotation axis, a plurality of lenses, and an image sensor configured to generate a plurality of partially captured images having different capturing angles based on a rotation of at least one of the first reflector or the second reflector, wherein the first reflector, the second reflector, the plurality of lenses, and the image sensor are provided in sequential order from a side of the object, wherein the partially captured images are synthesized into the captured image, and wherein the plurality of lenses includes a first lens, a second lens, a third lens, a fourth lens, and a fifth lens, which are provided in sequential order from the side of the object, and wherein a distance from the first lens to an upper surface is TTL, a synthetic focal length of the lens assembly is f', a focal length of the first lens is f1, a focal length of the second lens is f2, and the lens assembly satisfies $TTL/f'<1.0$, and $0<(f1+f2)/f'<0.03$.

A focal length of the third lens may be f3 and a focal length of the fourth lens may be f4, and the lens assembly may satisfy $0.04<(f3+f4)/f'<0.06$.

An Abbe number of the third lens may be L3Ab, an Abbe number of the fourth lens may be L4Ab, and the lens assembly may satisfy $19<L3Ab<25$, and $19<L4Ab<25$.

The first lens may have positive refractive power with a convex form on the side of the object, wherein the second lens may have negative refractive power, wherein the third lens may have positive refractive power with a biconvex form, wherein the fourth lens may have negative refractive power, and wherein the fifth lens may have positive refractive power.

Each of the plurality of partially captured images may correspond to a high-resolution telephoto image, wherein the captured image may correspond to a high-resolution wide-angle image, and wherein the plurality of partially captured images may form different regions corresponding to the different capturing angles in the captured image.

The lens assembly may further include an aperture stop provided between the second reflector and the plurality of lenses, the aperture stop being configured to adjust an amount of light.

According to yet another aspect of an example embodiment, there is provided a capturing method including generating a plurality of partially captured images having different capturing angles while adjusting a capturing angle by rotating at least one of a first reflector configured to rotate around a first rotation axis or a second reflector configured to rotate around a second rotation axis, and generating a single synthesized image based on the plurality of partially captured images.

Each of the plurality of partially captured images may correspond to a high-resolution telephoto image, and wherein the synthesized image may correspond to a high-resolution wide-angle image.

The plurality of partially captured images may form different regions corresponding to the different capturing angles in the synthesized image.

According to yet another aspect of an example embodiment, there is provided a non-transitory computer-readable storage medium storing instructions that are executable by a processor to perform a capturing method, the capturing method including generating a plurality of partially captured images having different capturing angles while adjusting a capturing angle by rotating at least one of a first reflector configured to rotate around a first rotation axis or a second reflector configured to rotate around a second rotation axis, and generating a single synthesized image based on the plurality of partially captured images.

According to yet another aspect of an example embodiment, there is provided a lens assembly including a first reflector configured to rotate around a first rotation axis, a second reflector configured to rotate around a second rotation axis, a plurality of lenses including one or more lenses, and an image sensor configured to generate a plurality of captured images having different capturing angles, wherein the first reflector, the second reflector, the plurality of lenses, and the image sensor are provided in sequential order from an object's side, and wherein the capturing angles of the plurality of captured images are adjusted based on a rotation of at least one of the first reflector and the second reflector.

BRIEF DESCRIPTION OF THE DRAWINGS

The above and/or other aspects will be more apparent by describing certain example embodiments, taken in conjunction with the accompanying drawings, in which.

DETAILED DESCRIPTION

Figure 1:
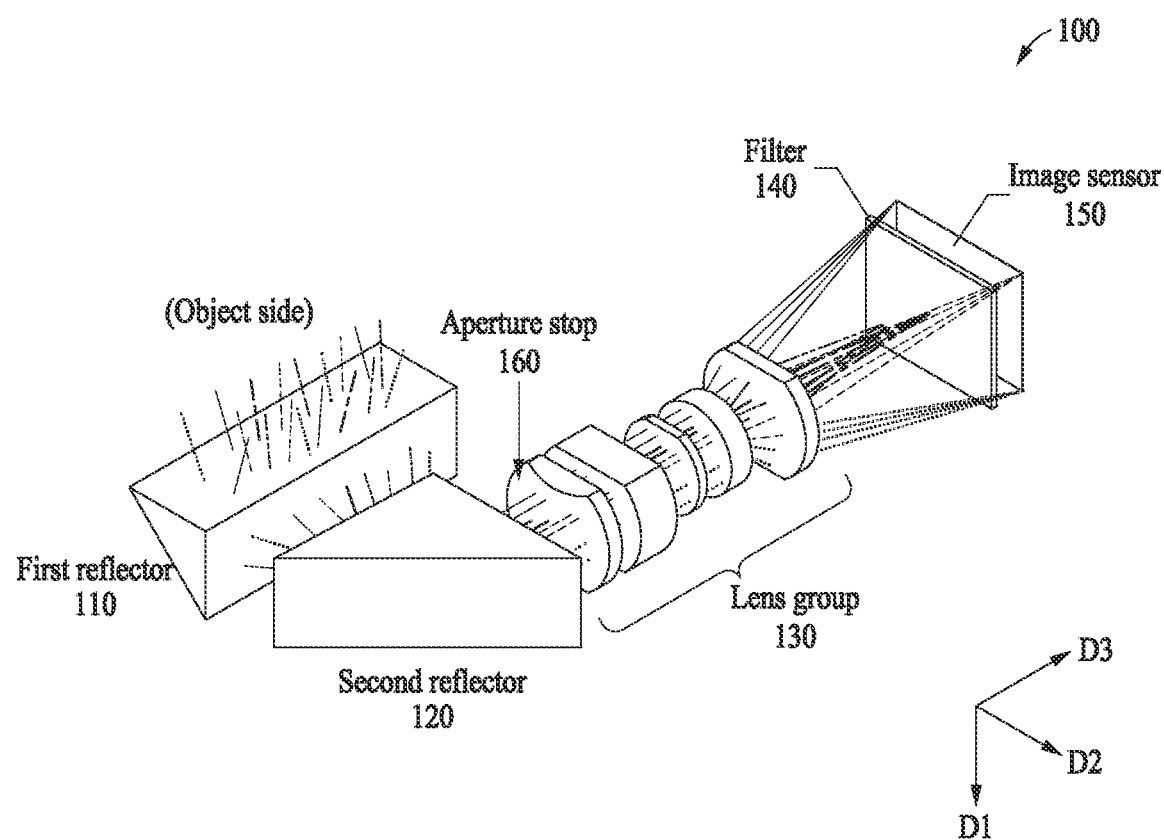
FIG. 1 is a diagram illustrating an example of a structure of a lens assembly according to an example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises," "comprising," "includes," and/or "including," when used in this specification, specify the presence of stated features, integers, steps, operations, elements, components or a combination thereof, but do not preclude the presence or addition of one or more other features, integers, steps, operations, elements, components, and/or groups thereof. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Hereinafter, examples will be described in detail with reference to the accompanying drawings, and like reference numerals in the drawings refer to like elements throughout. Also, in the description of example embodiments, detailed description of structures or functions that are thereby known after an understanding of the disclosure of the present application will be omitted when it is deemed that such description will cause ambiguous interpretation of the example embodiments.

FIG. 1 is a diagram illustrating an example of a structure of a lens assembly according to an example embodiment. Referring to FIG. 1, a lens assembly 100 may include reflectors 110 and 120, for example, the first reflector 110 and the second reflector 120, a lens group 130, a filter 140, and an image sensor 150. The lens assembly 100 may further include an aperture stop 160 configured to adjust an amount of light. The aperture stop 160 may be disposed between the second reflector 120 and the lens group 130.

The first reflector 110 may change a traveling path of light incident in a first direction D1 to a second direction D2. The second reflector 120 may change a traveling path of light incident in the second direction D2 to a third direction D3. For example, the first reflector 110 may be configured to bend the path of the light incident in the first direction D1 to the second direction D2 by an angle of 90 degrees (°). The second reflector 120 may be configured to bend the path of the light incident in the second direction D2 to the third direction D3 by an angle of 90°. According to an example embodiment, each of the reflectors 110 and 120 may include a first surface on which light is incident, a second surface by which the light is reflected, and a third surface from which the light is emitted. For example, each of the first reflector 110 and the second reflector 120 may correspond to a prism or include a mirror on the second surface.

The lens group 130 may include one or more lenses. For example, the lens group 130 may form a telephoto field of view (FOV) with five or more lenses. For example, the lens group 130 may include first through fifth lenses that are arranged in sequential order from the side of an object toward the side of the image sensor 150. In this example, the first lens, the third lens, and the fifth lens may have positive refractive power. The second lens and the fourth lens may have negative refractive power. For example, the first lens may have a positive refractive power with a convex form toward the object, and the third lens may have a positive refractive power with a biconvex form. The lens group 130 may refract a traveling path of light provided from the second reflector 120 and provide the refracted light to the image sensor 150.

The filter 140 may allow a predetermined wavelength band of light provided to the filter 140 from the first reflector 110, the second reflector 120, and the lens group 130 to pass therethrough and/or block the wavelength band of the light. The filter 140 may be, for example, an infrared filter configured to block light of an infrared band. The image sensor 150 may generate a captured image based on visual information of the object that is included in the light that passes through the first reflector 110, the second reflector 120, the lens group 130, and the filter 140 in sequential order.

The first reflector 110 may rotate around a first rotation axis, and the second reflector 120 may rotate around a second rotation axis. The first rotation axis and the second rotation axis may be vertical to each other. The first direction D1, the second direction D2, and the third direction D3 may be vertical to one another. The first rotation axis may be stretched in the third direction D3, and the second rotation axis may be stretched in the first direction D1. A capturing angle of a captured image may be adjusted based on a rotation of at least one of the first reflector 110 or the second reflector 120. An adjustment of an angle of a capturing view or capturing angle may be used for various applications. For example, the adjustment of an angle of a capturing view may be used to compensate for a hand movement and/or generate a high-resolution wide-angle image. However, the foregoing applications are provided merely as an example, and the adjustment may be used for other applications.

Figure 3:
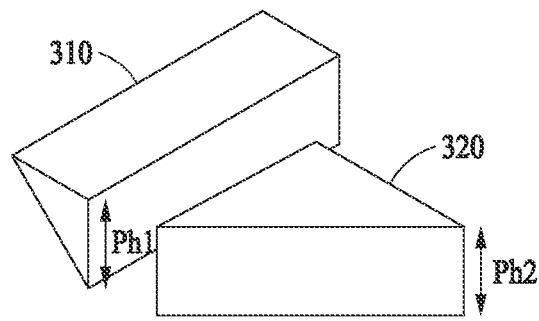
FIG. 3 is a diagram illustrating an example of a height of reflectors according to an example embodiment.

The lens assembly 100 may refract the visual information of the object received in the first direction D1 to the lens group 130 arranged in the third direction D3. Thus, the lens assembly 100 may have a high magnification with less space in the first direction D1. The lens assembly 100 may be provided in an electronic device requiring a small thickness, for example, a smartphone and a wearable device. In such a case, a height of the first reflector 110 and the second reflector 120, a height of each lens of the lens group 130, a height of the filter 140, and a height of the image sensor 150, which correspond to a length of the first direction D1, may be formed to have a small value. For example, the heights may each be formed to be 7 millimeters (mm) or less. As illustrated in FIG. 3, heights Ph1 and Ph2 of the first reflector 310 and the second reflector 320, corresponding to the first reflector 110 and the second reflector 120, may be formed to be less than or equal to 7 mm. In addition, each of the first reflector 110 and the second reflector 120 may be provided as a prism having a refractive index of 1.6 or greater.

Figure 2:
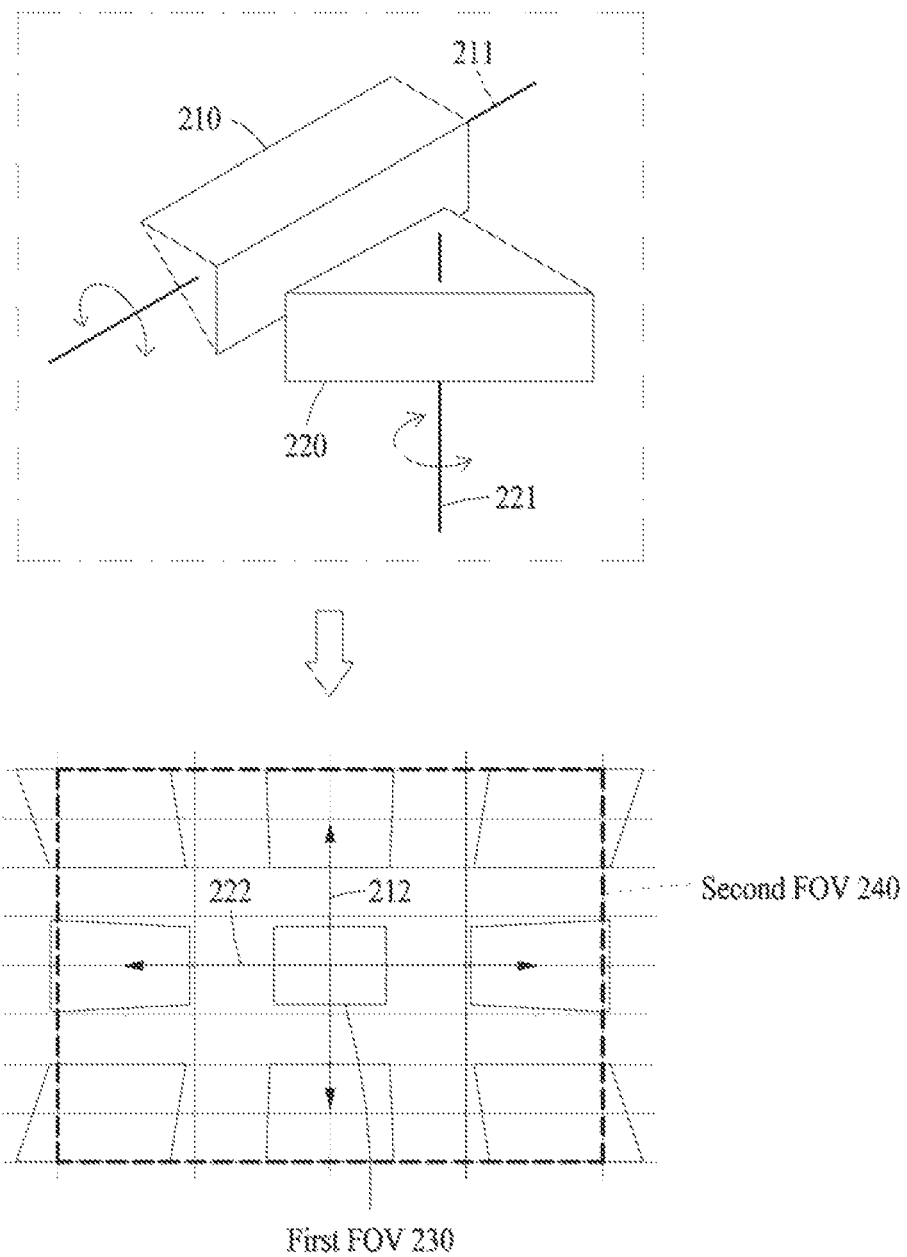
FIG. 2 is a diagram illustrating an example of adjusting an angle of a capturing view by rotating reflectors according to an example embodiment.

FIG. 2 is a diagram illustrating an example of adjusting an angle of a capturing view by rotating reflectors according to an example embodiment. Referring to FIG. 2, a first reflector 210 may rotate on a first rotation axis 211 and a second reflector 220 may rotate on a second rotation axis 221. For example, a lens assembly may further include at least one driver configured to rotate at least one of the first reflector 210 or the second reflector 220. By a rotation of at least one of the first reflector 210 and the second reflector 220, an angle of a capturing view may be adjusted. As the angle of the capturing view is adjusted, a capturing region may change. The angle of the capturing view may indicate a direction the first reflector 210 faces or views, and the capturing region may indicate a region from which an image is to be captured in the direction. The first reflector 210 and the second reflector 220 may correspond to the first reflector 110 and the second reflector 120 as illustrated in FIG. 1.

In the example of FIG. 2, a first FOV 230 may be a narrower FOV than a second FOV 240. For example, the first FOV 230 may correspond to a telephoto, and the second FOV 240 may correspond to a wide angle. For example, when the first reflector 210 and the second reflector 220 are used in a telephoto lens assembly with the first FOV 230, a capturing region of the first FOV 230 may move as the angle of the capturing view is adjusted. For example, the capturing region may move in a first direction 212 in response to the angle of the capturing view being adjusted based on the first rotation axis 211. The capturing region may move in a second direction 222 in response to the angle of the capturing view being adjusted based on the second rotation axis 221. The first rotation axis 211 and the second rotation axis 221 may be vertical to each other, and the first direction 212 and the second direction 222 may be vertical to each other. For example, the first direction 212 may be a vertical direction, and the second direction 222 may be a horizontal direction.

According to an example embodiment, an angle of a capturing view may be adjusted to compensate for a hand shaking-derived movement caused by shaking of the hand. For example, when a hand shaking-derived movement is sensed, at least one driver of the lens assembly may rotate at least one of the first reflector 210 or the second reflector 220 to compensate for the movement. When a capturing region is changed by a hand shaking, the driver may rotate at least one of the first reflector 210 or the second reflector 220 to restore the capturing region. When the lens assembly is used for telephoto video capturing, there may be severe hand shaking or swaying. Thus, such a compensating operation may be performed to allow the video capturing to be performed stably.

According to another example embodiment, an angle of a capturing view may be adjusted to generate a high-resolution wide-angle image. For example, by capturing an image of a capturing region of the second FOV 240 several times with the first FOV 230 while adjusting an angle of a capturing view, a plurality of captured images may be generated and the captured images may be synthesized into a single high-resolution wide-angle image. Each of the captured images may be a high-resolution telephoto image, and the captured images may form different regions corresponding to different capturing views in the high-resolution wide-angle image. Each of the captured images may also be referred to herein as a partial image of a synthesized image or a partially captured image. For example, the capturing region of the second FOV 240 may be divided into 5*4 sub-capturing regions. In this example, by capturing each of the sub-capturing regions with the first FOV 230, 20 captured images may be generated and the 20 captured images may be synthesized into a high-resolution wide-angle image. The synthesized image may have a relatively higher resolution compared to a single image of the second FOV 240.

Figure 4:
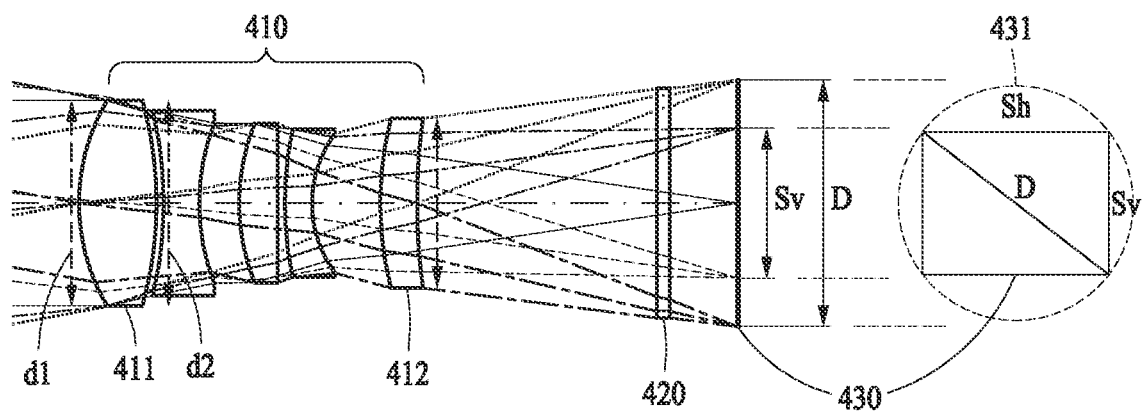
FIG. 4 is a diagram illustrating an example of an arrangement between an aperture of lenses and an image circle of an image sensor according to an example embodiment.

FIG. 4 is a diagram illustrating an example of an arrangement between an aperture of lenses and an image circle of an image sensor according to an example embodiment. Referring to FIG. 4, light corresponding to visual information of an object may be provided to an image sensor 430 through a lens group 410 and a filter 420. The lens group 410 may include one or more lenses. For example, the lens group 410 may include a total of m lenses, for example, a first lens 411 through an mth lens 412. For a telephoto lens, m may denote an integer greater than or equal to 5. In this example, an aperture circle of each lens of the lens group 410 may be smaller than an image circle 431 of the image sensor 430. For example, a first aperture d1, a second aperture d2, ..., and an nth aperture do may all be smaller than the image circle 431. A diameter D of the image circle 431 may correspond to a diagonal length of the image sensor 430. A width of the image sensor 430 may be indicated as Sh, and a height of the image sensor 430 may be indicated as Sv. The width Sh and the height Sv may also be referred to as a long side and a short side, respectively. As described above with reference to FIG. 1, the height Sv may be associated with a thickness of an electronic device. Thus, when the electronic device is required to be thin, the height Sv may be formed to have potentially a minimum value, for example, 7 mm or less.

Figure 5:
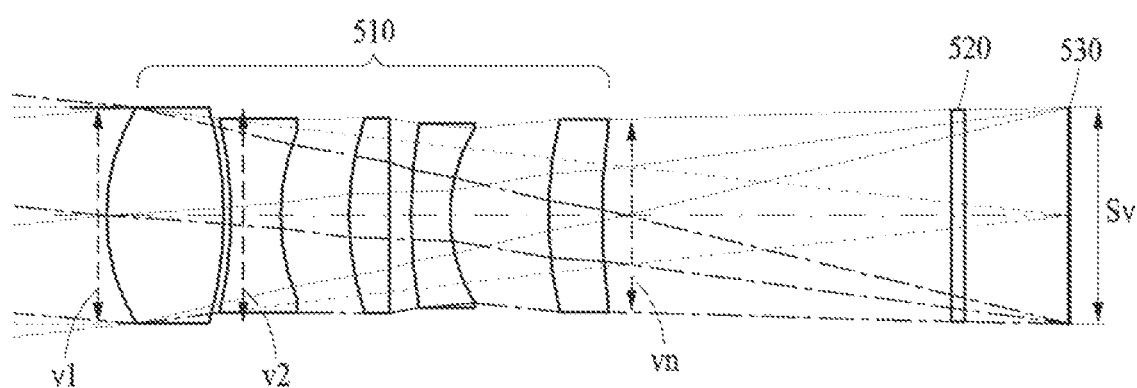
FIG. 5 is a diagram illustrating an example of an arrangement between a height of an aperture of lenses and a height of an image sensor according to an example embodiment.

FIG. 5 is a diagram illustrating an example of an arrangement between a height of an aperture of lenses and a height of an image sensor according to an example embodiment. Referring to FIG. 5, light corresponding to visual information of an object may be provided to an image sensor 530 through a lens group 510 and a filter 520. A height of each lens of the lens group 510 may be formed to match a height Sv of the image sensor 530. For example, when an image formation range corresponding to the height Sv is defined on the image sensor 530, an aperture height of each lens of the lens group 510 corresponding to positions through which rays provided in the image formation range pass through each lens of the lens group 510 may be defined. In this example, the aperture height of each lens may be formed to be less than or equal to the sensor height Sv. For example, a first aperture height v1, a second aperture height v2, ..., and an nth aperture height vn may all be formed to be less than or equal to the sensor height Sv.

Figure 6:
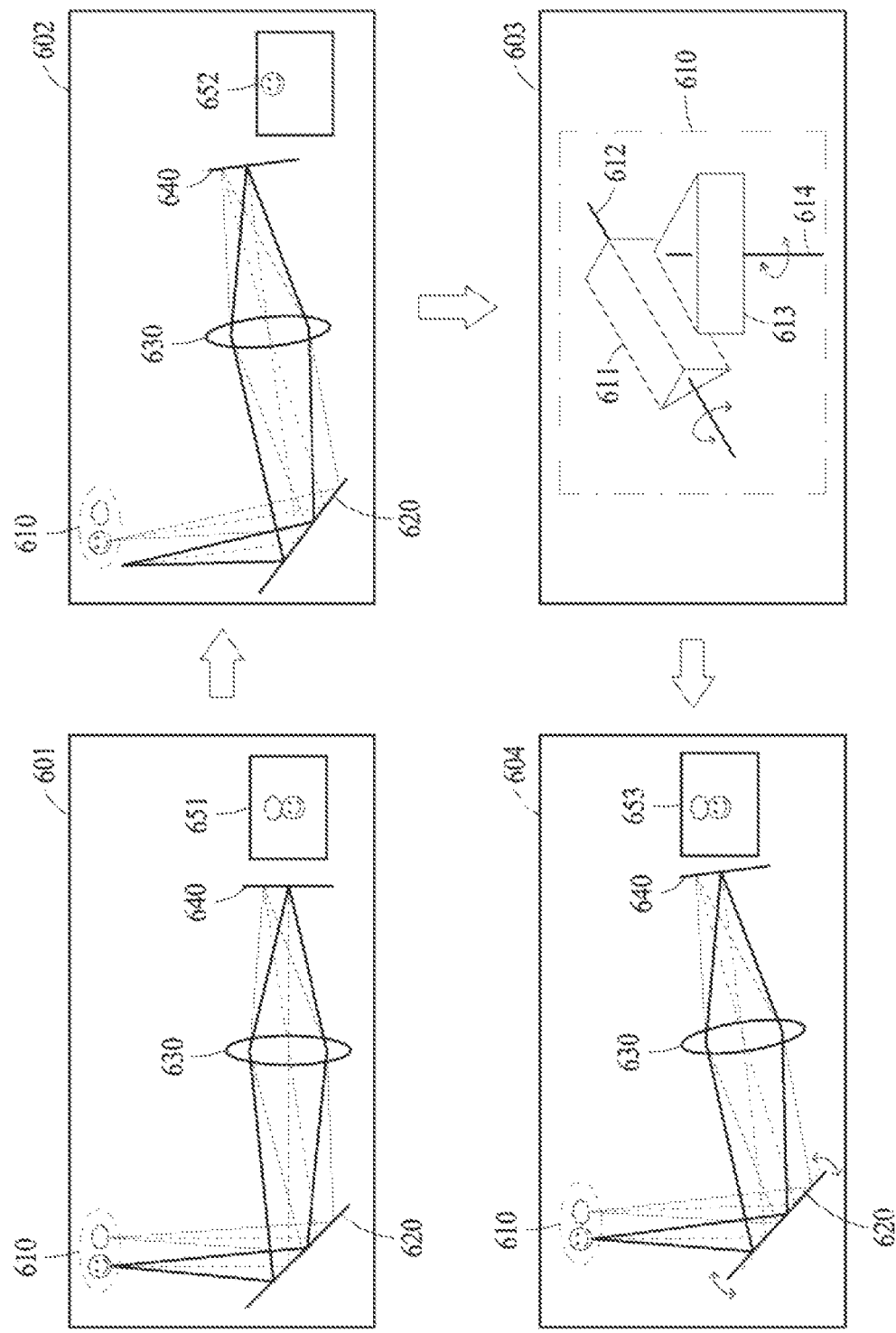
FIG. 6 is a diagram illustrating an example of compensating for a hand movement according to an example embodiment.

FIG. 6 is a diagram illustrating an example of compensating for a shaking hand according to an example embodiment. A first block 601 of FIG. 6 illustrates a situation in which an image of an object 610 is captured in a normal manner in which there is no hand shaking. Light including visual information of the object 610 may be provided to an image sensor 640 after passing through a reflector 620 and a lens 630. The image sensor 640 may then generate a captured image 651 that shows the object 610. Although the reflector 610 and the lens 630 are illustrated respectively as a single reflector and a single lens in FIG. 6 as an example, the reflector 620 and the lens 630 may be provided respectively as a plurality of reflectors and a plurality of lenses. In addition, a filter may be added between the lens 630 and the image sensor 640.

A second block 602 of FIG. 6 illustrates a situation in which an image of the object 610 is not captured in a normal manner due to the hand shaking. For example, only a portion of the object 610 may be shown in a captured image 652 due to the hand shaking. In this example, such hand shaking may be compensated for by a rotation of the reflector 620 as illustrated in a third block 603 of FIG. 6. For example, the reflector 620 may include a first reflector 611 and a second reflector 613, and the first reflector 611 and the second reflector 613 may rotate respectively on a first rotation axis 612 and a second rotation axis 614. The first reflector 611 and the second reflector 613 may rotate through a rotation driver. A controller and/or processor may sense an angle of the hand shaking through a gyro sensor, and control the rotation driver of the first reflector 611 and/or the second reflector 613 by calculating horizontal and vertical angles required for the compensation for the hand shaking. The hand shaking may be compensated for by the rotation of the reflector 620, and an image of the object 610 may thereby be captured in a normal manner. A captured image 653 may include the entire object 610.

Such hand shaking compensation may provide an elaborate gimbal function. A method such as a lens shift method and a sensor shift method may provide a compensation range of 1° or less. However, the compensation method using two reflectors, for example, the first and second reflectors 611 and 613, may provide a compensational angle of ±10° or greater and may thus respond to a stronger hand shaking. In addition, a rotation of an image may be minimized during an angle adjustment, and thus cropping and warping may not be necessary for an image synthesis. Thus, it is possible to improve a sensor utilization, reduce a processing complexity, and prevent or reduce the degradation of an image quality or resolution.

Figure 7:
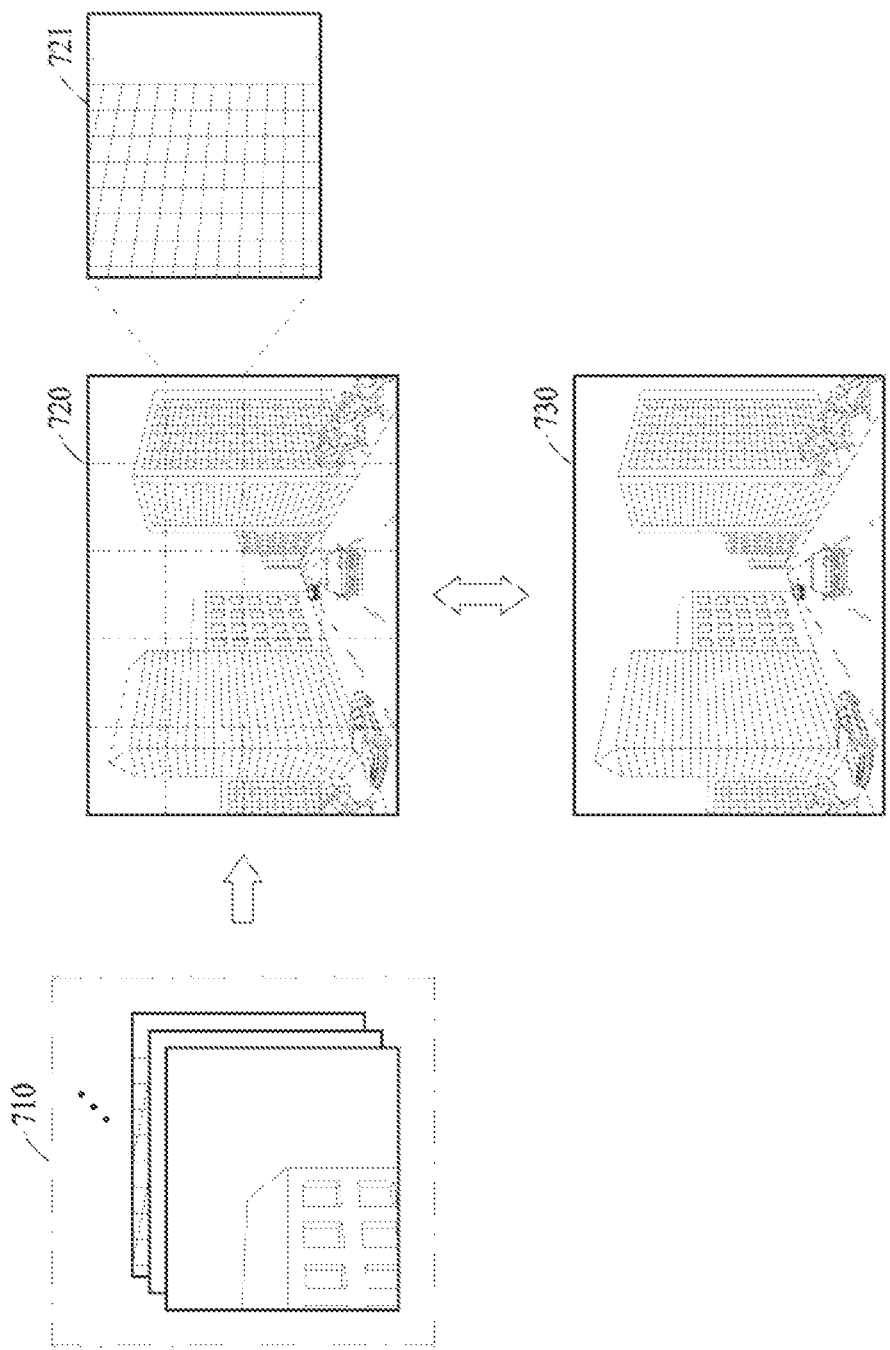
FIG. 7 is a diagram illustrating an example of generating a high-resolution wide-angle image according to an example embodiment.

FIG. 7 is a diagram illustrating an example of generating a high-resolution wide-angle image according to an example embodiment. Referring to FIG. 7, a plurality of captured images 710, which are images captured with different capturing views, may be generated by a rotation of a reflector. The captured images 710 may be synthesized into a first wide-angle image 720. The captured images 710 may be generated through continuous capturing or discontinuous or divided capturing.

The captured images 710 may respectively correspond to broken line blocks in the first wide-angle image 720. For example, the number of the captured images 710 included in the first wide-angle image 720 may be 5*4 as shown by the broken line blocks. In this example, the 5*4 captured images 710 may be generated by capturing 5*4 times while changing an angle of a capturing view in horizontal and vertical directions. However, the number is provided merely as an example, and other numbers of captured images and other numbers of times of capturing may be applied. When the number of captured images and/or the number of times of capturing increases, high-resolution capturing may be enabled. The first wide-angle image 720 may have a relatively higher resolution than a second wide-angle image 730 that is generated through single capturing. For example, when a portion of the first wide-angle image 720 is enlarged, an enlarged image 721 of the enlarged portion may have the same high resolution.

According to an example embodiment, the first wide-angle image 720 and the second wide-angle image 730 may be generated simultaneously, and at least a portion of the first wide-angle image 720 may be provided at the request of a user. For example, when the user performs telephoto capturing, the second wide-angle image 730 may be provided. By adjusting an angle of a capturing view in a short period of time in which the second wide-angle image 730 is generated, the captured images 710 may be generated. The captured images 710 may be synthesized into the first wide-angle image 720.

The first wide-angle image 720 may be stored in a user terminal and/or a server. When the user enlarges the second wide-angle image 730 or requests the first wide-angle image 720, at least a portion of the first wide-angle image 720 may be provided to the user. For example, when the user enlarges or zooms a portion of the second wide-angle image 730, the second wide-angle image 730 may be enlarged or zoomed up to a resolution supported by a wide-angle camera, and the first wide-angle image 720 may be provided starting from a magnification at which an image quality starts to be degraded. When the user indicates a portion he/she desires to store, the portion may be cropped from the first wide-angle image 720, and a final image of the cropped portion may be provided. In addition, when the user activates a high-resolution wide-angle capturing option, the first wide-angle image 720 may be entirely provided. Further, when the user sets a block that is not as indicated by the broken lines in the first wide-angle image 720, a high-resolution wide-angle image may be captured by synthesizing images that are captured while a capturing angle is being adjusted according to the set block.

Figure 8:
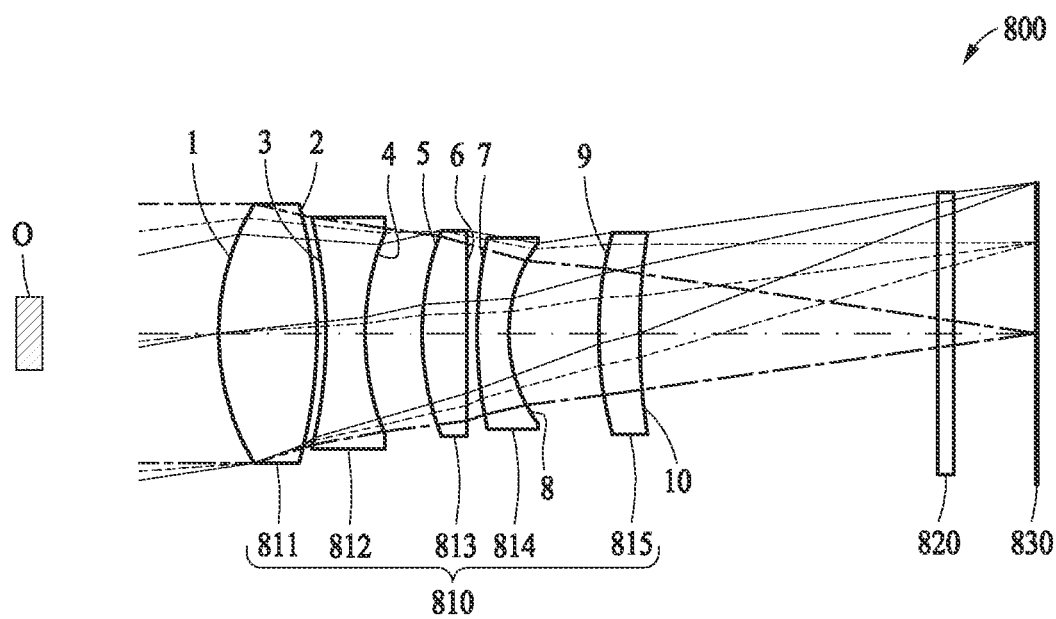
FIG. 8 is a diagram illustrating an example of a structure of lenses of a lens assembly according to an example embodiment.

FIG. 8 is a diagram illustrating an example of a structure of lenses of a lens assembly according to an example embodiment. Referring to FIG. 8, a lens assembly 800 may include a lens group 810, a filter 820, and an image sensor 830. The lens group 810 may include lenses 811 through 815. The lens group 810 may include the first lens 811 having positive refractive power with a convex form toward an object O, the second lens 812 having negative refractive power, the third lens 813 having positive refractive power with a biconvex form, the fourth lens 814 having negative refractive power, and the fifth lens 815 having positive refractive power. An aperture stop (or STOP as indicated in the following tables) configured to adjust an amount of light may be disposed on an object side of the first lens 811. For example, the aperture stop may be disposed as indicated by the following example numerical values.

Where a distance from the first lens 811 to an upper surface (or an image plane) is TTL, a synthetic focal length of the lens assembly 800 is f', a focal length of the first lens 811 is f1, and a focal length of the second lens 812 is f2, the lens assembly 800 may satisfy the following Equations 1 and 2.

$$TTL/f'<1.0 \qquad \text{[Equation 1]}$$

$$0<(f1+f2)/f'<0.03 \qquad \text{[Equation 2]}$$

Where a focal length of the third lens 813 is f3 and a focal length of the fourth lens 814 is f4, the lens assembly 800 may satisfy the following Equation 3.

$$0.04<(f3+f4)/f'<0.06 \qquad \text{[Equation 3]}$$

Where an Abbe number of the third lens 813 is L3Ab and an Abbe number of the fourth lens 814 is L4Ab, the lens assembly 800 may satisfy the following Equations 4 and 5.

$$19<L3Ab<25 \qquad \text{[Equation 4]}$$

$$19<L4Ab<25 \qquad \text{[Equation 5]}$$

Tables 1 and 2 below indicate example numerical values associated with the lens assembly 800. In Tables 1 and 2, 1 through N denote the numbers of lens surfaces, in which N is a natural number. These are allocated in sequential order from a side of the object O toward a side of the image sensor 830.

TABLE 1

|  | Radius | Thickness | Index |
|---|---|---|---|
| First reflector | infinity | 2.0 | 8466.238 |
|  | infinity | 2.0 | 8466.238 |
|  | infinity | 1.5 |  |
| Second reflector | infinity | 3.4 | 8466.238 |
|  | infinity | 3.4 | 8466.238 |
|  | infinity | 2.008 |  |
| STOP | infinity | −0.808 |  |
| 1 | 4.8647196 | 2.030 | 5348.557 |
| 2 | −8.410408 | 0.15 |  |
| 3 | −12.07049 | 0.955 | 6144.259 |
| 4 | 5.026249 | 1.128 |  |
| 5 | 6.1433834 | 0.985 | 6707.192 |
| 6 | −68.49743 | 0.188 |  |
| 7 | 8.2700876 | 0.685 | 6144.259 |
| 8 | 2.8338054 | 1.800 |  |
| 9 | 7.373176 | 0.957 | 5441.561 |
| 10 | 11.680651 | 6.307 |  |
| Filter | infinity | 0.3 | 5168.642 |
|  | infinity | 1.789 |  |
| Image sensor |  |  |  |

TABLE 2

|  | dn | vn |
|---|---|---|
| STOP | 2.700 | 1.940 |
| 1 | 2.700 | 1.940 |

TABLE 2-continued

|  | dn | vn |
|---|---|---|
| 2 | 2.524 | 1.820 |
| 3 | 2.431 | 1.777 |
| 4 | 2.148 | 1.678 |
| 5 | 2.092 | 1.744 |
| 6 | 2.000 | 1.696 |
| 7 | 1.953 | 1.644 |
| 8 | 1.811 | 1.502 |
| 9 | 2.201 | 1.650 |
| 10 | 2.228 | 1.652 |
| Filter | 2.993 | 1.873 |
|  | 3.017 | 1.880 |
| Image sensor | 3.240 | 1.944 |

Tables 3 and 4 below indicate aspherical surface factors associated with the foregoing numerical values.

TABLE 3

|  | K | A | B |
|---|---|---|---|
| 1 | −0.62317 | 5.0256E−04 | 2.8934E−05 |
| 2 | −6.406442 | 1.0112E−03 | −4.8180E−05 |
| 3 | 0 | −1.4801E−03 | 2.3934E−04 |
| 4 | 0.003552 | −4.2791E−03 | 1.9551E−04 |
| 5 | −1.822932 | −1.6071E−03 | 2.5231E−04 |
| 6 | −99 | −2.0705E−03 | 5.1234E−04 |
| 7 | −1.998207 | −4.0142E−03 | 6.4186E−04 |
| 8 | −0.877361 | −4.2588E−03 | 1.2933E−03 |
| 9 | 1.9678733 | −7.6789E−03 | 3.9460E−04 |
| 10 | −41.08265 | −3.4227E−03 | −2.1922E−04 |

TABLE 4

|  | C | D | E |
|---|---|---|---|
| 1 | −6.8317E−08 | 2.8819E−07 | −4.8854E−08 |
| 2 | 1.1736E−06 | −1.0713E−06 | 9.6365E−08 |
| 3 | −2.1684E−05 | 1.2036E−06 | 2.9074E−08 |
| 4 | −5.3448E−06 | 3.9470E−06 | −2.1785E−07 |
| 5 | −5.6234E−05 | 6.7174E−06 | 1.3752E−07 |
| 6 | −9.7370E−05 | 5.2445E−06 | 3.0409E−07 |
| 7 | 9.7963E−05 | −4.6148E−05 | 2.6706E−06 |
| 8 | 2.5837E−04 | −4.9576E−05 | −1.0761E−06 |
| 9 | 1.3338E−04 | −4.7468E−07 | −7.8099E−07 |
| 10 | 1.4584E−04 | −1.2427E−05 | 9.9128E−07 |

An aspherical surface factor may be defined as represented by the following Equation 6.

$$Z(r) = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}$$ [Equation 6]

In Equation 6 above, Z(r) denotes a distance in an optical axis (A) direction from an apex of a lens, c denotes an inverse number (1/R) of a curvature radius at the apex of the lens, r denotes a distance in a vertical direction from the optical axis A, and k denotes a conic constant, and A, B, C, D, E, and F denote aspherical surface factors.

Figure 9:
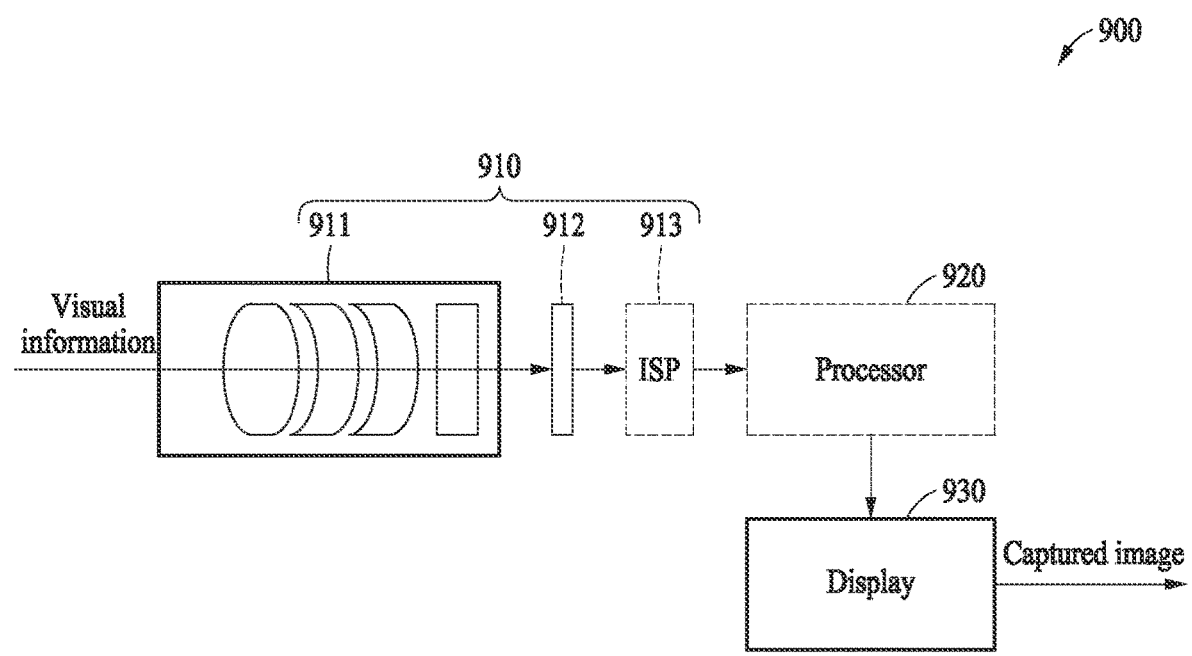
FIG. 9 is a diagram illustrating an example of generating a captured image by an electronic device according to an example embodiment.

FIG. 9 is a diagram illustrating an example of generating a captured image by an electronic device according to an example embodiment. Referring to FIG. 9, an electronic device 900 may include an imaging assembly 910, a processor 920, and a display 930. The imaging assembly 910 may include an optical system 911, an image sensor 912, and an image signal processor (ISP) 913. The optical system 911 may include reflectors, a lens group, and a filter. According to an example embodiment, the imaging assembly 910 may include the lens assembly 100 described above with reference to FIG. 1. The imaging assembly 910 may sense visual information of an object through the lens assembly 100, and the processor 920 may generate a captured image based on the visual information.

The ISP 913 and the processor 920 may perform processing to convert the sensed information to the captured image. For example, the ISP 913 may perform preprocessing on the sensed information. The processor 920 may generate the captured image based on a result of the preprocessing. As another example, the ISP 913 or the processor 920 may perform all the processes required to generate the captured image. In this example, except for one of the ISP 913 and the processor 920 that performs the processes, the other one may be omitted. The imaging assembly 910 may generate a plurality of captured images having different capturing views based on a rotation of at least one of the reflectors. The processor 920 may then synthesize the captured images into a high-resolution wide-angle image. The imaging assembly 910 may include a rotation driver configured to rotate at least one of the reflectors, and the processor 920 may control the rotation driver to adjust an angle of a capturing view. The display 930 may display the captured image.

Figure 10:
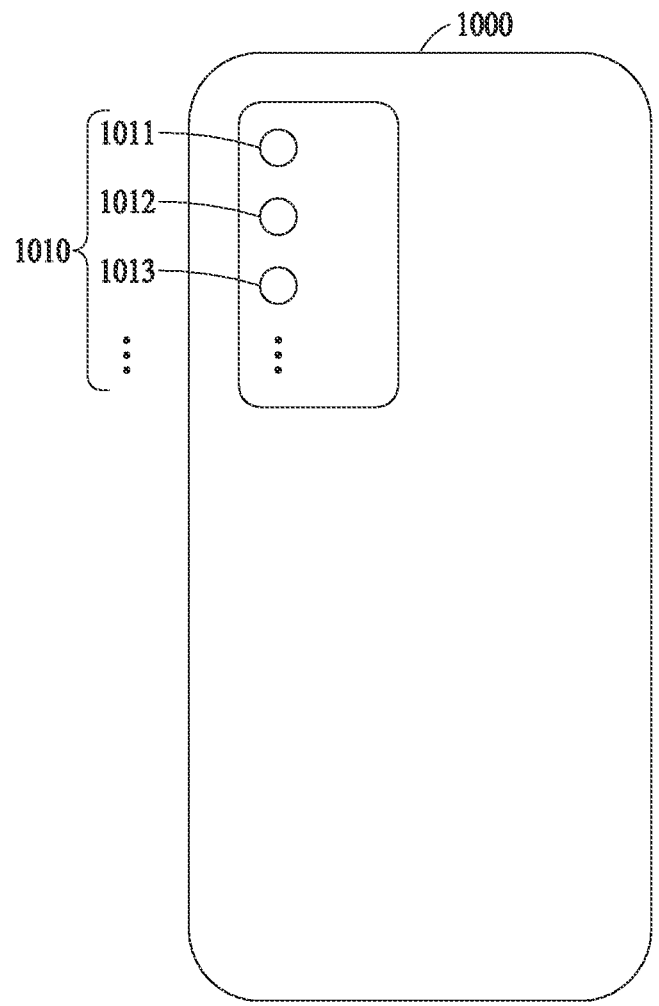
FIG. 10 is a diagram illustrating an example of an electronic device in which imaging assemblies are provided according to an example embodiment.

FIG. 10 is a diagram illustrating an example of an electronic device in which imaging assemblies are provided according to an example embodiment. Referring to FIG. 10, an electronic device 1000 may include an imaging device 1010 that includes imaging assemblies 1011, 1012, and 1013. For example, one of the imaging assemblies 1011, 1012, and 1013 may perform wide-angle capturing, and another one may perform telephoto capturing. The imaging assembly that performs telephoto capturing may include the lens assembly 100 described above with reference to FIG. 1. Although the imaging device 1010 is illustrated as a rear camera of a smartphone in FIG. 10, the imaging device 1010 may also be a front camera of the smartphone. In addition, although the electronic device 1000 is illustrated as a smartphone, the electronic device 1000 may also be a mobile device such as a personal digital assistant (PDA), a netbook, a tablet computer, and a laptop computer, a wearable device such as a smartwatch, a smart band, and smart eyeglasses, a computing device such as a desktop and a server, a home appliance such as a television (TV), a smart TV, and a refrigerator, a security device such as a door lock and a close-circuit TV (CCTV), a vehicle such as an autonomous driving vehicle and a smart vehicle, a camera such as a virtual reality (VR)/augmented reality (AR) camera and a 360° camera, and other devices such as a drone.

Figure 11:
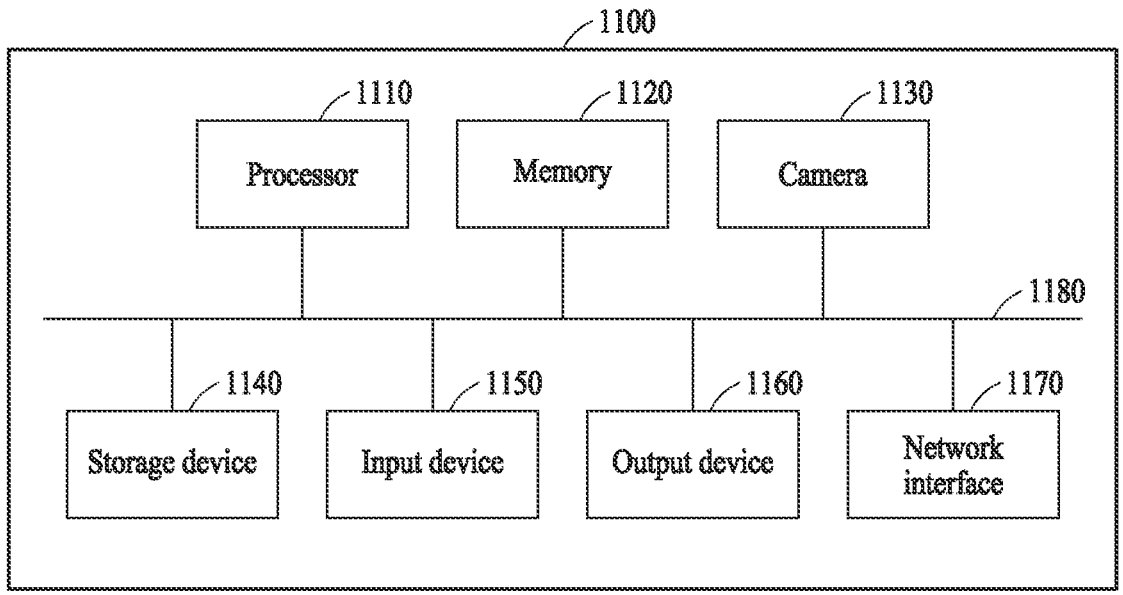
FIG. 11 is a diagram illustrating an example of a configuration of an electronic device according to an example embodiment.

FIG. 11 is a diagram illustrating an example of a configuration of an electronic device according to an example embodiment. Referring to FIG. 11, an electronic device 1100 may include a processor 1110, a memory 1120, a camera 1130, a storage device 1140, an input device 1150, an output device 1160, and a network interface 1170, which may communicate with one another through a communication bus 1180. For example, the electronic device 1100 may be provided as at least a portion of a mobile device such as a mobile phone, a smartphone, a PDA, a netbook, a tablet computer, and a laptop computer, a wearable device such as a smartwatch, a smart band, and smart eyeglasses, a computing device such as a desktop and a server, a home appliance such as a TV, a smart TV, and a refrigerator, a security device such as a door lock, a vehicle such as an autonomous driving vehicle and a smart vehicle, a camera such as a VR/AR camera and a 360° camera, and other devices such as a drone.

The processor 1110 may execute functions and instructions to be executed in the electronic device 1100. For example, the processor 1110 may process instructions stored in the memory 1120 or the storage device 1140. The processor 1110 may perform the operations or processes described herein with reference to FIGS. 1 through 10, and 12. The memory 1120 may include a computer-readable storage medium or device. The memory 1120 may store instructions to be executed by the processor 1110 and store related information while software or program is being executed in the electronic device 1100.

The camera 1130 may capture a still image and/or a moving image (or a video). The storage device 1140 may include a computer-readable storage medium or device. The storage device 1140 may store a greater amount of information than the memory 1120 for a long period of time. The storage device 1140 may include, for example, a magnetic hard disk, an optical disc, a flash memory, a floppy disc, or other types of nonvolatile memory that are well-known in related technical fields.

The input device 1150 may receive an input from a user through an input means such as a keyboard and a mouse, or through an input means that is based on a touch input, a voice input, and an image input. The input device 1150 may include, as non-limiting examples, a keyboard, a mouse, a touchscreen, a microphone, and other devices configured to detect the input from the user and transfer the detected input to the electronic device 1100. The output device 1160 may provide the user with an output of the electronic device 1100 through a visual, audio, or tactile channel. The output device 1160 may include, as non-limiting examples, a display, a touchscreen, a speaker, a vibration generator, and other devices configured to provide the user with the output. The network interface 1170 may communicate with an external device through a wired or wireless network.

Figure 12:
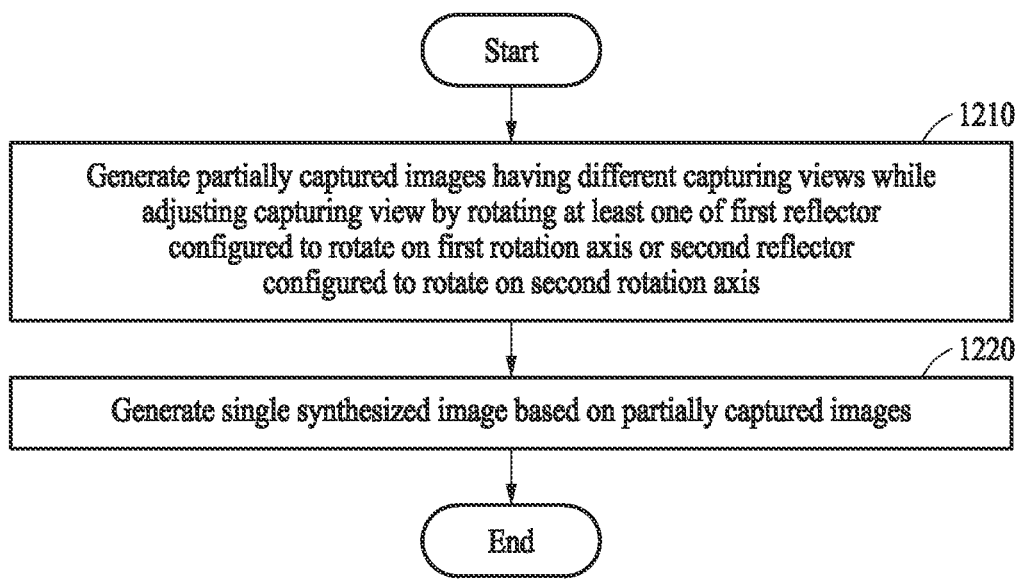
FIG. 12 is a flowchart illustrating an example of a capturing method according to an example embodiment.

FIG. 12 is a flowchart illustrating an example of a capturing method according to an example embodiment. Referring to FIG. 12, in operation 1210, an electronic device may generate a plurality of partially captured images having different capturing views while adjusting a capturing view by rotating at least one of a first reflector configured to rotate on a first rotation axis or a second reflector configured to rotate on a second rotation axis. In operation 1220, the electronic device may generate a single synthesized image based on the partially captured images. Each of the partially captured images may correspond to a high-resolution telephoto image, and the synthesized image may correspond to a high-resolution wide-angle image. The partially captured images may form different regions corresponding to different capturing views in the synthesized image. For a more detailed description of the capturing method, reference may be made to what has been described above with reference to FIGS. 1 through 11.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

Example embodiments include non-transitory computer-readable media including program instructions to implement various operations embodied by a computer. The media may also include, alone or in combination with the program instructions, data files, data structures, tables, and the like. The media and program instructions may be those specially designed and constructed for the purposes of example embodiments, or they may be of the kind well known and available to those having skill in the computer software arts. Examples of non-transitory computer-readable media include magnetic media such as hard disks, floppy disks, and magnetic tape, optical media such as CD ROM disks, magneto-optical media such as floptical disks, and hardware devices that are specially configured to store and perform program instructions, such as read-only memory devices (ROM) and random-access memory (RAM). Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

The foregoing example embodiments are merely exemplary and are not to be construed as limiting. The present disclosure can be readily applied to other types of apparatuses. Also, the description of the example embodiments is intended to be illustrative, and not to limit the scope of the claims, and many alternatives, modifications, and variations will be apparent to those skilled in the art.

While example embodiments have been described with reference to the figures, it will be understood by those of ordinary skill in the art that various changes in form and details may be made therein without departing from the spirit and scope as defined by the following claims and their equivalents.

What is claimed is:

1. A lens assembly comprising:
a first reflector configured to rotate around a first rotation axis;
a second reflector configured to rotate around a second rotation axis;
a plurality of lenses;
an image sensor configured to generate a plurality of captured images having different capturing angles based on a rotation of at least one of the first reflector and the second reflector; and
a processor,
wherein the first reflector, the second reflector, the plurality of lenses, and the image sensor are provided in sequential order,
wherein the plurality of lenses comprises a first lens, a second lens, a third lens, a fourth lens, and a fifth lens, which are provided in sequential order,
wherein a distance from the first lens to the image sensor is TTL, a synthetic focal length of the lens assembly is f', a focal length of the first lens is f1, a focal length of the second lens is f2, and the lens assembly satisfies:
TTL/f'<1.0, and
0<(f1+f2)/f'<0.03,
wherein the image sensor is further configured to capture a predetermined number of telephoto sub-capturing regions included in a capturing region to generate the plurality of captured images, respectively, based on the rotation of at least one of the first reflector and the second reflector, and
wherein the processor is configured to synthesize the plurality of captured images into a synthesized image corresponding to a high-resolution wide-angle image.

2. The lens assembly of claim 1, wherein a focal length of the third lens is f3, a focal length of the fourth lens is f4, and the lens assembly satisfies:
0.04<(f3+f4)/f'<0.06.

3. The lens assembly of claim 1, wherein an Abbe number of the third lens is L3Ab, an Abbe number of the fourth lens is L4Ab, and the lens assembly satisfies:
19<L3Ab<25, and
19<L4Ab<25.

4. The lens assembly of claim 1, wherein the first lens has positive refractive power with a convex form,
wherein the second lens has negative refractive power,
wherein the third lens has positive refractive power with a biconvex form,
wherein the fourth lens has negative refractive power, and
wherein the fifth lens has positive refractive power.

5. The lens assembly of claim 1, wherein the plurality of captured images form different regions corresponding to the different capturing angles in the synthesized image.

6. The lens assembly of claim 1, further comprising:
an aperture stop provided between the second reflector and the plurality of lenses, the aperture stop being configured to adjust an amount of light.

7. The lens assembly of claim 1, wherein an aperture circle of each of the plurality of lenses is smaller than an image circle of the image sensor.

8. The lens assembly of claim 1, wherein an aperture height of each of the plurality of lenses corresponding to positions through which rays provided in an image formation range corresponding to a short side of the image sensor pass the lenses respectively is less than or equal to the short side of the image sensor.

9. The lens assembly of claim 1, wherein a short side of the image sensor is less than or equal to 7 millimeters.

10. An electronic device comprising:
an imaging assembly configured to sense visual information of an object by a lens assembly, the imaging assembly being configured to generate a captured image based on the visual information; and
a display configured to display the captured image,
wherein the lens assembly comprises:
a first reflector configured to rotate around a first rotation axis;
a second reflector configured to rotate around a second rotation axis;
a plurality of lenses;
an image sensor configured to generate a plurality of partially captured images having different capturing angles based on a rotation of at least one of the first reflector or the second reflector; and
a processor,
wherein the first reflector, the second reflector, the plurality of lenses, and the image sensor are provided in sequential order from a side of the object,
wherein the partially captured images are synthesized into the captured image, and
wherein the plurality of lenses comprises a first lens, a second lens, a third lens, a fourth lens, and a fifth lens, which are provided in sequential order from the side of the object,
wherein a distance from the first lens to the image sensor is TTL, a synthetic focal length of the lens assembly is f', a focal length of the first lens is f1, a focal length of the second lens is f2, and the lens assembly satisfies:
TTL/f'<1.0, and
0<(f1 +f2)/f'<0.03,
wherein the image sensor is further configured to capture a predetermined number of telephoto sub-capturing regions included in a capturing region to generate a plurality of captured images, respectively, based on the rotation of at least one of the first reflector and the second reflector, and
wherein the processor is configured to synthesize the plurality of captured images into a synthesized image corresponding to a high-resolution wide-angle image.

11. The electronic device of claim 10, wherein a focal length of the third lens is f3, a focal length of the fourth lens is f4, and the lens assembly satisfies:
0.04<(f3+f4)/f'<0.06.

12. The electronic device of claim 10, wherein an Abbe number of the third lens is L3Ab, an Abbe number of the fourth lens is L4Ab, and the lens assembly satisfies:
19<L3Ab<25, and
19<L4Ab<25.

13. The electronic device of claim 10, wherein the first lens has positive refractive power with a convex form toward the side of the object,
wherein the second lens has negative refractive power,
wherein the third lens has positive refractive power with a biconvex form,
wherein the fourth lens has negative refractive power, and
wherein the fifth lens has positive refractive power.

14. The electronic device of claim 10, wherein the lens assembly further comprises:
an aperture stop provided between the second reflector and the plurality of lenses, the aperture stop being configured to adjust an amount of light.

15. A capturing method comprising:
generating a plurality of partially captured images, by an image sensor, having different capturing angles by capturing a predetermined number of telephoto sub-capturing regions included in a capturing region respectively while adjusting a capturing angle by rotating at least one of a first reflector configured to rotate around a first rotation axis or a second reflector configured to rotate around a second rotation axis and passing through a plurality of lenses; and generating a single synthesized image, by a processor, corresponding to a high-resolution wide-angle image based on the plurality of partially captured images.

16. The capturing method of claim 15, wherein the plurality of partially captured images form different regions corresponding to the different capturing angles in the synthesized image.

17. A non-transitory computer-readable storage medium storing instructions that are executable by a processor to perform a capturing method, the capturing method comprising:

generating a plurality of partially captured images, by an image sensor, having different capturing angles by capturing a predetermined number of telephoto sub-capturing regions included in a capturing region respectively while adjusting a capturing angle by rotating at least one of a first reflector configured to rotate around a first rotation axis or a second reflector configured to rotate around a second rotation axis and passing through a plurality of lenses; and generating a single synthesized image, by a processor, corresponding to a high-resolution wide-angle image based on the plurality of partially captured images.

18. A lens assembly comprising:

a first reflector configured to rotate around a first rotation axis;

a second reflector configured to rotate around a second rotation axis;

a plurality of lenses;

an image sensor configured to generate a plurality of captured images having different capturing angles; and a processor, wherein the first reflector, the second reflector, the plurality of lenses, and the image sensor are provided in sequential order, and wherein the different capturing angles of the plurality of captured images are adjusted based on a rotation of at least one of the first reflector and the second reflector, wherein the image sensor is further configured to capture a predetermined number of telephoto sub-capturing regions included in a capturing region to generate the plurality of captured images, respectively, based on the rotation of at least one of the first reflector and the second reflector, and wherein the processor is configured to synthesize the plurality of captured images into a synthesized image corresponding to a high-resolution wide-angle image.

* * * * *